United States Patent
Qian et al.

(10) Patent No.: US 11,609,627 B2
(45) Date of Patent: Mar. 21, 2023

(54) TECHNIQUES FOR PROCESSING AUDIBLE INPUT DIRECTED TO SECOND DEVICE BASED ON USER LOOKING AT ICON PRESENTED ON DISPLAY OF FIRST DEVICE

(71) Applicant: Lenovo (Singapore) Pte. Ltd., Singapore (SG)

(72) Inventors: Ming Qian, Cary, NC (US); John Weldon Nicholson, Cary, NC (US); Song Wang, Cary, NC (US); Roderick Echols, Chapel Hill, NC (US); Ryan Charles Knudson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 77 days.

(21) Appl. No.: 16/708,426

(22) Filed: Dec. 9, 2019

(65) Prior Publication Data
US 2021/0173475 A1    Jun. 10, 2021

(51) Int. Cl.
*G06F 3/01* (2006.01)
*G06F 3/04842* (2022.01)
*G06F 3/16* (2006.01)
*G06F 3/04817* (2022.01)
*G06F 3/04815* (2022.01)

(52) U.S. Cl.
CPC .......... *G06F 3/013* (2013.01); *G06F 3/04815* (2013.01); *G06F 3/04817* (2013.01); *G06F 3/04842* (2013.01); *G06F 3/167* (2013.01)

(58) Field of Classification Search
CPC combination set(s) only.
See application file for complete search history.

(56) References Cited

U.S. PATENT DOCUMENTS

2003/0142125 A1* 7/2003 Salmimaa ......... H04M 1/72454
                                                     715/733
2009/0320091 A1* 12/2009 Torres ................. G06F 21/6218
                                                     726/1

(Continued)

OTHER PUBLICATIONS

"Proximity Sensors", ST—life.augmented, retrieved Oct. 1, 2019 from https://www.st.com/en/imaging-and-photonics-solutions/proximity-sensors.html.

(Continued)

*Primary Examiner* — William Boddie
*Assistant Examiner* — Alecia D English
(74) *Attorney, Agent, or Firm* — John M. Rogitz; John L. Rogitz

(57) ABSTRACT

In one aspect, a first device may include at least one processor, a display accessible to the at least one processor, and storage accessible to the at least one processor. The storage may include instructions executable by the at least one processor to present an icon on the display so that the icon appears disposed within the real world at or proximate to a location of a second device associated with the icon. The second device may be different from the first device and exist in the real world. The instructions may also be executable to identify a user of the first device as looking at the icon, receive audible input from the user, and issue a command to the second device to execute at least one function in conformance with the audible input based on the identification of the user as looking at the icon.

20 Claims, 7 Drawing Sheets

(56) References Cited

U.S. PATENT DOCUMENTS

| | | | |
|---|---|---|---|
| 2010/0304787 A1* | 12/2010 | Lee | H04N 21/4126 455/556.1 |
| 2011/0043651 A1 | 2/2011 | Nonaka et al. | |
| 2012/0259638 A1 | 10/2012 | Kalinli | |
| 2012/0268286 A1* | 10/2012 | Jin | G06F 3/0481 340/815.4 |
| 2012/0295708 A1* | 11/2012 | Hernandez-Abrego | G06F 3/167 463/36 |
| 2013/0069985 A1* | 3/2013 | Wong | G02B 27/0189 345/633 |
| 2013/0304479 A1* | 11/2013 | Teller | G06F 3/167 704/E21.001 |
| 2014/0330560 A1 | 11/2014 | Venkatesha et al. | |
| 2016/0106394 A1* | 4/2016 | Kang | G06F 3/04842 600/437 |
| 2016/0155009 A1* | 6/2016 | Han | H04N 5/23222 382/173 |
| 2016/0161598 A1 | 6/2016 | Stutz et al. | |
| 2016/0274762 A1* | 9/2016 | Lopez | G06T 19/006 |
| 2017/0097678 A1* | 4/2017 | McLean | G06F 3/013 |
| 2018/0204385 A1* | 7/2018 | Sarangdhar | G08C 17/02 |
| 2019/0073800 A1* | 3/2019 | Lochny | H04L 12/282 |
| 2020/0380977 A1* | 12/2020 | Unter Ecker | G06K 9/00604 |
| 2021/0142582 A1* | 5/2021 | Jones | G06T 19/006 |

OTHER PUBLICATIONS

Staff Writer, "Differentiation of Sound Fields (in Relation to Noise Reduction)", db Noise Reduction, Jan. 25, 2017.

VanBlon et al., "Execution of Function Based on User Being within Threshold Distance to Apparatus", file history of related U.S. Appl. No. 16/692,499, filed Nov. 22, 2019.

VanBlon et al., "Execution of Function Based on User Being within Threshold Distance to Apparatus", related U.S. Appl. No. 16/692,499, Non-Final Office Action dated Jun. 7, 2021.

VanBlon et al., "Execution of Function Based on User Being within Threshold Distance to Apparatus", related U.S. Appl. No. 16/692,499, Applicant's response to Non-Final Office Action filed Jun. 22, 2021.

VanBlon et al., "Execution of Function Based on User Being within Threshold Distance to Apparatus", related U.S. Appl. No. 16/692,499, Final Office Action dated Oct. 5, 2021.

* cited by examiner

TECHNIQUES FOR PROCESSING AUDIBLE INPUT DIRECTED TO SECOND DEVICE BASED ON USER LOOKING AT ICON PRESENTED ON DISPLAY OF FIRST DEVICE

FIELD

The present application relates to technically inventive, non-routine solutions that are necessarily rooted in computer technology and that produce concrete technical improvements.

BACKGROUND

Currently, to trigger a digital assistant to listen for voice input from a user to perform a task, utterance a wake-up word or phrase is typically required to notify the digital assistant that ensuing words spoken by the user are meant to be provided as input. As recognized herein, this can create a host of problems. For instance, where multiple digital assistant-enabled devices exist in the same room, multiple different wake up words might need to be remembered based on which associated device the user wishes to invoke. Furthermore, in situations where the user wishes to invoke a digital assistant while carrying on a conversation with another person, uttering the wake up word or phrase interrupts the conversation. What's more, even in situations where digital assistants might not require utterance of a wake up word to be triggered but multiple associated devices are present in a single room, a user's utterance of a command may be picked up by more than one digital assistant, leading to unintentional input to unintended devices. There are currently no adequate solutions to the foregoing computer-related, technological problem.

SUMMARY

Accordingly, in one aspect a first device includes at least one processor, a display accessible to the at least one processor, and storage accessible to the at least one processor. The storage includes instructions executable by the at least one processor to present an icon on the display so that the icon appears disposed within the real world at or proximate to a location of a second device associated with the icon. The second device is different from the first device and exists in the real world. The instructions are also executable to identify a user of the first device as looking at the icon, receive audible input from the user, and issue a command to the second device to execute at least one function in conformance with the audible input based on the identification of the user as looking at the icon.

Proximate to the location of the second device may include within a threshold non-zero distance to the second device, and/or above or next to the location of the second device at a same depth as the second device relative to the first device.

Additionally, in some examples the instructions may be executable to receive the audible input from the user while the user is identified as looking at the icon and then issue the command to the second device based on the audible input being received while the user is identified as looking at the icon. The user may be identified as looking at the icon based on input from at least one camera included on the first device.

Also in some examples, the instructions may be executable to identify the user of the first device as looking at the icon for at least a threshold non-zero amount of time, and then to issue the command to the second device based on the identification of the user as looking at the icon for at least the threshold non-zero amount of time.

Additionally, in some implementations the instructions may be executable to identify a selection of the icon by the user via user input other than the user looking at the icon. The instructions may then be executable to present a first graphical user interface (GUI) on the display based on the identification of the selection of the icon, with the first GUI including one or more graphical elements other than the icon that are related to the second device. Thus, the first GUI as presented on the display may include elements from a second GUI that the second device is configured to present on a display of the second device itself. Additionally or alternatively, the first GUI as presented on the display may include a hybrid of respective elements from second and third GUIs that the second device may be configured to present on the display of the second device itself, where the second and third GUIs are different from each other.

Also in some examples, the instructions may be executable to issue the command to the second device based on the identification of the user as looking at the icon without also receiving a wake up word from the user. Still further, note that the at least one function itself may relate to operation of hardware of the second device.

In another aspect, a method includes identifying a user of a first device as looking at one or more of a second device different from the first device, and a graphical element presented on a display of the first device and associated with the second device. The method also includes identifying audible input from the user and, based on the identifying of the user as looking at one or more of the second device and the graphical element, transmitting an indication to the second device to execute at least one function in conformance with the audible input.

In some examples, the method may include identifying the user as looking at the graphical element presented on the display of the first device, and the graphical element may be presented on the display so that the graphical element appears disposed within the real world at or proximate to a real world location of the second device. Proximate to the real world location of the second device may be within a threshold non-zero distance to the second device, and/or may be above or next to the location of the second device at a same real world depth as the second device relative to the first device.

Additionally, in some implementations the graphical element may be a first graphical element, the audible input may be first audible input, and the indication may be a first indication. In these implementations, the method may include presenting a second graphical element on the display of the first device, where the second graphical element may be associated with a third device different from the first device and different from the second device. The second graphical element may be different from the first graphical element and may be concurrently presented on the display with the first graphical element. The method may then include identifying the user of the first device as looking at the second graphical element, identifying second audible input from the user, and transmitting a second indication to the third device to execute at least one function in conformance with the second audible input based on the identification of the user as looking at the second graphical element.

Still further, in some examples the method may include presenting the graphical element on the display using augmented reality software and identifying the user as looking at the graphical element presented on the display of the first device.

Also in some examples, the method may include presenting the graphical element on the display responsive to determining that the second device itself is not visible to the user relative to the current location of the user, and then identifying the user as looking at the graphical element presented on the display of the first device.

In another aspect, a method includes presenting a graphical element on a display of a first device, with the graphical element associated with a second device other than the first device. The method also includes identifying a user of the first device as looking at the graphical element, identifying audible input from the user, and transmitting an indication to the second device to execute at least one function in conformance with the audible input based on the identification of the user as looking at the graphical element.

In some examples, the graphical element may be presented on the display so that the graphical element appears disposed within the real world at or proximate to a real world location of the second device. Proximate to the real world location of the second device may be within a threshold non-zero distance to the second device, and/or above or next to the location of the second device at a same real world depth as the second device relative to the first device.

In some examples, the graphical element may be a first graphical element, the audible input may be first audible input, and the indication may be a first indication. In these examples, the method may include presenting a second graphical element on the display of the first device, where the second graphical element may be associated with a third device different from the first device and different from the second device. The second graphical element may also be different from the first graphical element and may be concurrently presented on the display with the first graphical element. The method may then include identifying the user of the first device as looking at the second graphical element, identifying second audible input from the user, and transmitting a second indication to the third device to execute at least one function in conformance with the second audible input based on the identification of the user as looking at the second graphical element.

Additionally, in some implementations the method may include presenting the graphical element on the display using augmented reality (AR) software. Also in some implementations, the method may include presenting the graphical element on the display responsive to determining that the second device itself is not visible to the user relative to the current location of the user.

In another aspect, at least one computer readable storage medium (CRSM) that is not a transitory signal includes instructions executable by at least one processor to identify a user of a first device as looking at one or more of a second device different from the first device, and a graphical element presented on a display of the first device and associated with the second device. The instructions are also executable to identify audible input from the user and to transmit a notification to the second device to execute at least one function in conformance with the audible input based on the identification of the user as looking at one or more of the second device and the graphical element.

In some examples, the instructions may be executable to identify the user of the first device as looking at the graphical element presented on the display of the first device and to transmit the notification to the second device based on the identification of the user as looking at the graphical element.

The graphical element may be presented on the display of the first device to appear at or proximate to the real world location of the second device.

The details of present principles, both as to their structure and operation, can best be understood in reference to the accompanying drawings, in which like reference numerals refer to like parts, and in which:

DETAILED DESCRIPTION

Figure 1:
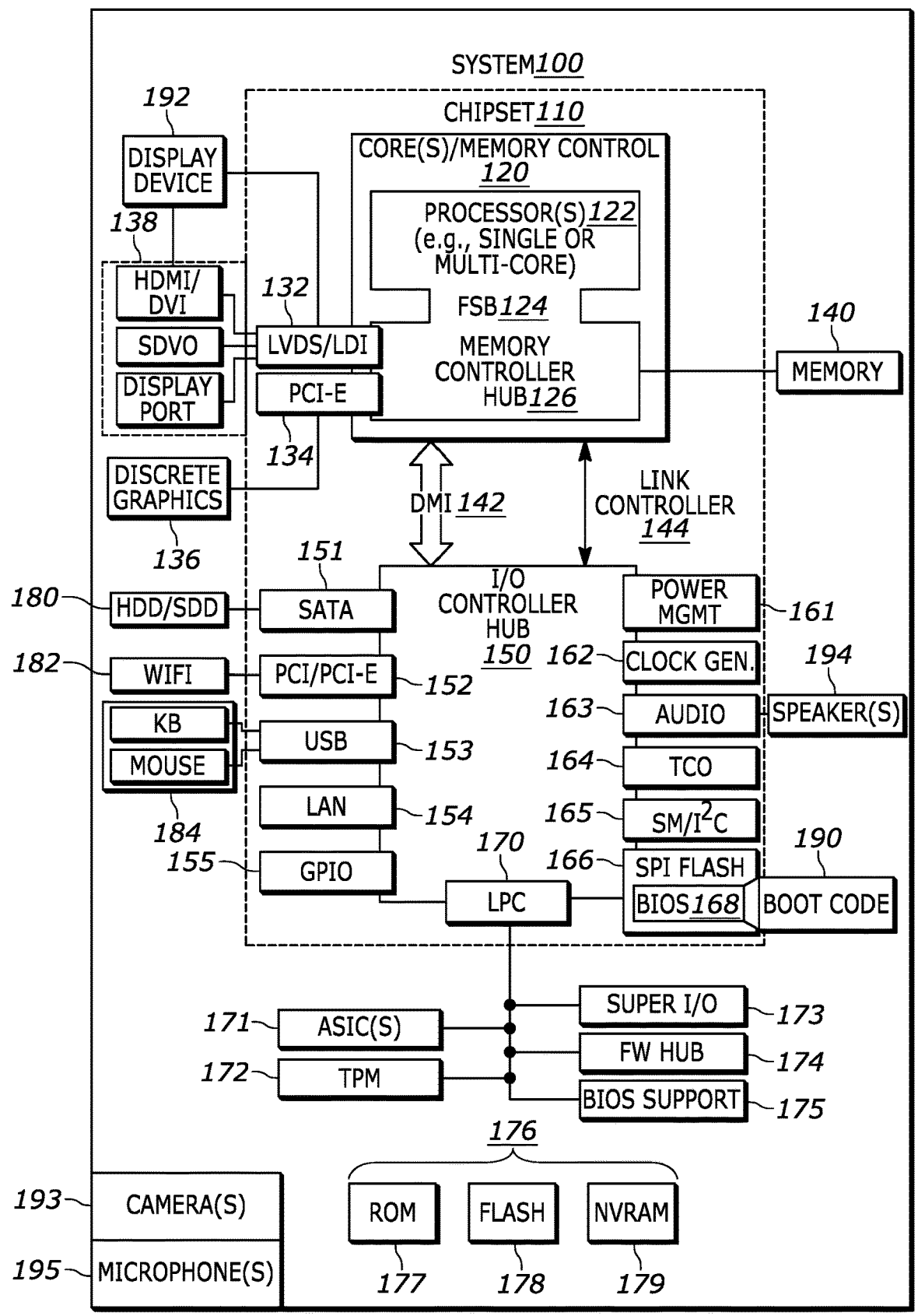
FIG. 1 is a block diagram of an example system consistent with present principles.

The present application discloses systems and methods for people wearing augmented reality (AR) headsets such as computerized glasses (e.g., a Microsoft HoloLens, Google Glass, or Osterhout Design Group (ODG) glasses) to have icons virtually overlaid on their field of view, with the icons pertaining to other devices controllable using voice input. This might be useful for, e.g., doctors and nurses in a hospital ward. Thus, if a doctor or nurse's speech is meant to be directed toward a certain device as voice input, the doctor/nurse can fixate his or her gaze onto the specific virtual device icon associated with that device that is in his or her field of view while speaking (or fix his or her gaze as looking near or in the direction of the icon). Consequently, the AR headset and/or other device may use a digital assistant (e.g., Apple's Siri, Amazon's Alexa, Google's Assistant etc.) to know that part of the speech is being directed towards it. Thus, medical staff members may interact with different devices in the ward (e.g., computational and medical) without interrupting the normal conversation flow with a patient and relatives in the same room. The other devices might include, e.g., an x-ray machine, an ultrasound machine, an EKG machine, a blood pressure machine, an oxygen level monitor, IV delivery equipment, etc.

For example, a nurse might look at an icon presented on the transparent display of his headset that is associated with an intravenous (IV) machine and utter, "I will start an IV line on you, and give you a 10 mg sleeping pill, called benzodiazepine, right now". That in turn may be detected by the headset and the headset may then issue a command to the IV machine such as "automatically configure IV device to administer fluids now".

As another example, a nurse might speak in natural language that "I am putting EKG probes on your chest, and we will monitor your heart for 10 minutes, okay" while gazing at a virtual icon for an associated electrocardiogram (EKG) machine. That in turn may be detected by the headset and the headset may then issue a command to the EKG machine such as "automatically set timer of EKG equipment for 10 minutes, begin timer and monitor".

As still another example, a doctor might speak "So your fever started three days ago, accompanied with symptoms such as coughing and nausea" while gazing at virtual icon associated with a computer that is separate from the doctor's headset. That in turn may be detected by the headset and the headset may then issue a command to the computer to input the related information into an electronic medical record (EMR) system (e.g., "fever for three days, coughing, nausea").

In addition to or in lieu of the foregoing, note that in various embodiments the other machine may have its own microphone and digital assistant for processing voice input. In these embodiments, the headset may be used to determine which other machine the headset's wearer/user is looking at (or looking near or in the direction of) and then transmit an indication to that machine that any voice input that the other machine detects itself while the headset is indicating the user as looking at the other machine is to be processed by the machine.

Furthermore, note that present principles may be used even where the physical machine itself might not be visible to the user from the user's current field of view. For example and again in the medical context, the machine might be located behind the back of another doctor/nurse or in a closed cabinet or under the patient's bed.

For interaction with a machine for a relatively short period of time, gaze-while-talking may be used where any utterances the headset wearer/user makes while looking at an icon may get directed to the associated machine itself. But, in some examples for interaction for a relatively longer period of time with a given machine, the user's gaze can be used to lock the headset on a certain icon for any utterances spoken by the user subsequent to that to be directed to the associated machine even if the user stops looking at the associated icon while providing the utterance(s). The other machine may then be released/unlocked after the user's interaction is determined to be complete, after a threshold amount of time passes during which no audible input is detected, and/or upon an unlock command being received from the user.

Further still, the user of the headset may select an icon presented on the headset's transparent display using input other than eye input. This may be used as a command to the headset for the headset to present more details of a user interface of the machine. The user may then gaze at different parts of that user interface to provide further user input for even more interaction.

Prior to delving further into the details of the instant techniques, note that present principles may apply in other contexts besides health care. For example, present principles may be applied to devices/machines within a residential household, a lab, a warehouse, etc.

Also note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for wired and/or wireless communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may further include an audio receiver/microphone 195 that provides input from the microphone 195 to the processor 122 based on audio that is detected, such as via a user providing audible input to the microphone 195 consistent with present principles. Still further, the system 100 may include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
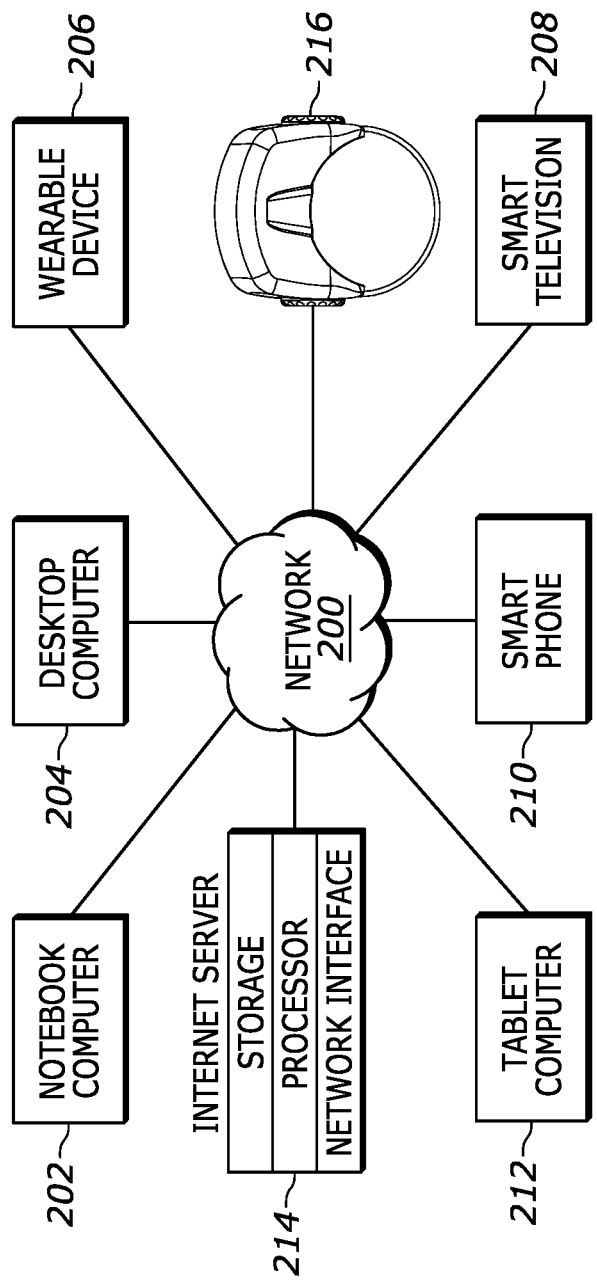
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 are configured to communicate with each other over the network 200 to undertake present principles.

Figure 3:
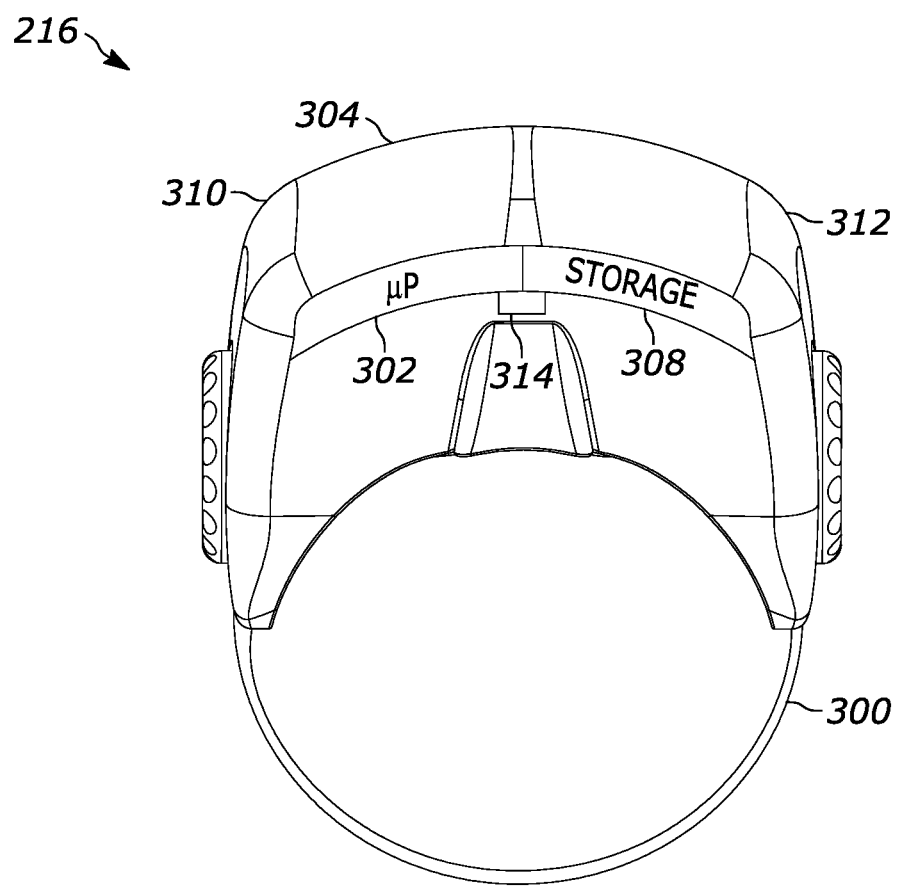
FIG. 3 shows a top plan view of an augmented reality (AR) headset that may be used consistent with present principles.

Now describing FIG. 3, it shows a top plan view of a headset, such as the headset 216, consistent with present principles. The headset 216 may include a housing 300, at least one processor 302 in the housing, and a transparent "heads up" display 304 accessible to the at least one processor and coupled to the housing. Additionally, the headset 316 may include storage 308 accessible to the processor 302 and coupled to the housing 300, as well as one or more cameras 310, 312 accessible to the processor 302 and coupled to the housing 300 for use as disclosed herein. Thus, the cameras 310, 312 may be oriented to face away from the headset 216 in the front-facing direction in which a user's head would be oriented when wearing the headset 216. The headset 216 may also include one or more cameras 314 oriented inward to image the user's eyes while the user wears the headset 216 for eye tracking consistent with present principles.

Still further, note that the headset 216 may include still other components not shown for simplicity, such as a network interface for communicating over a network such as the Internet and a battery for powering components of the headset 216. Additionally, note that while the headset 216 is illustrated as an augmented reality (AR) headset, the headset 216 may also be established by another type headset such as a virtual reality (VR) headset that may not have a transparent display but may still be able to present electronic content such as virtual AR icons along with a real-world, real-time camera feed of an environment imaged by one or more of the cameras 310, 312 to provide an AR experience to the user. Also note that electronic contact lenses with their own respective heads up displays may also be used consistent with present principles.

Figure 4:
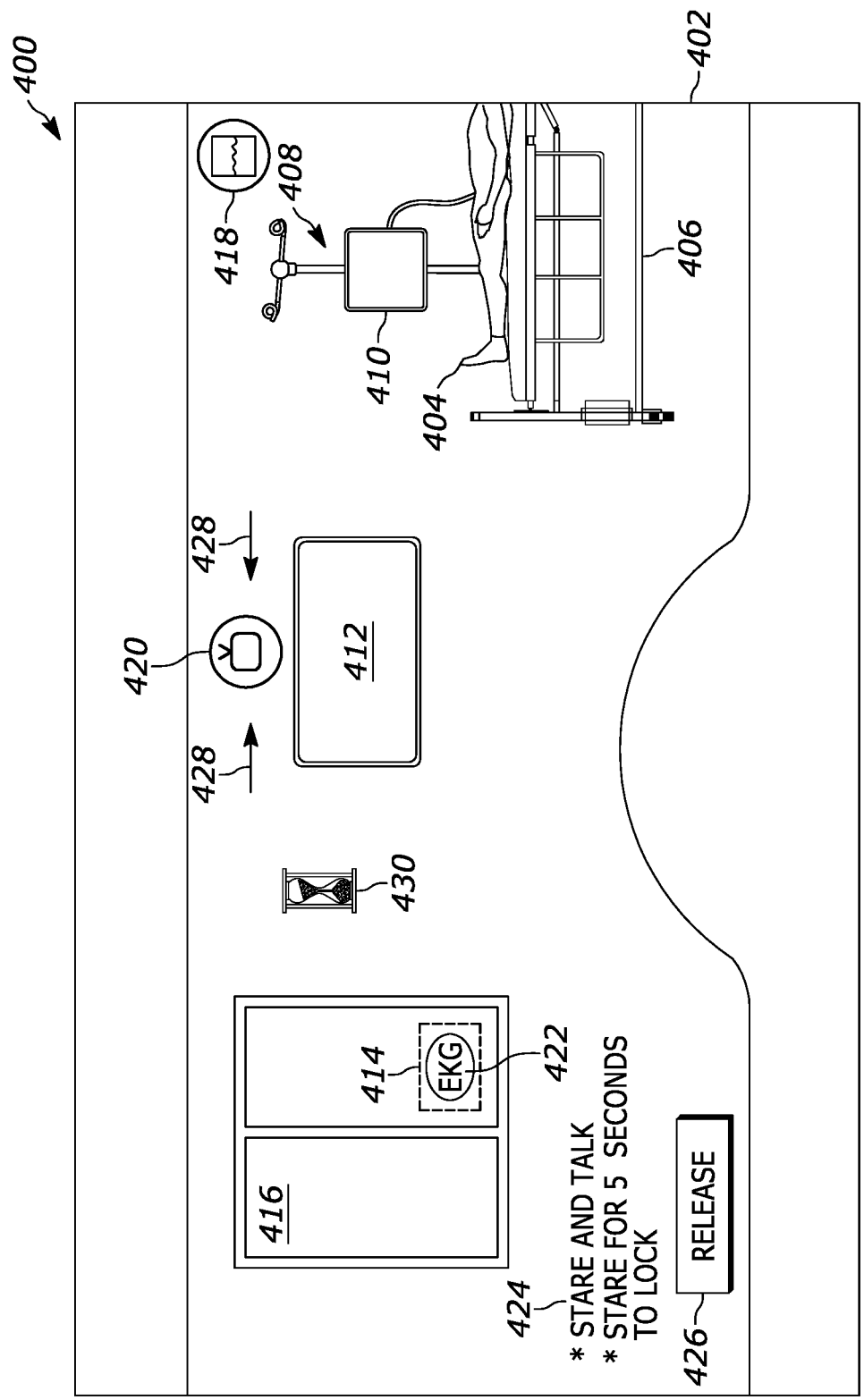
FIG. 4 shows the perspective of a user of the AR headset while viewing the real world through the headset's transparent display consistent with present principles.

Now describing FIG. 4, it shows a perspective 400 of a user while wearing a headset having a transparent display 402 through which the real world may be viewed. In this example, the wearer/user of the headset is disposed within a hospital room and, relative to the perspective 400 shown, a patient 404 is partially shown as laying on a hospital bed 406 while hooked up to an intravenous (IV) machine/device 408 for the machine 408 to administer fluids and medicine to the patient 404 according to a prescribed flow rate. The prescribed flow rate itself may be represented on an electronic display 410 of the machine 408.

Based on the user's headset receiving camera images from a camera on the headset that faces outward away from the headset to mimic the actual view of the user through the display 402, the headset may execute object recognition to identify and track the location of the machine 408 relative to the headset as the user moves. The camera images may also be used to identify a television 412 mounted on a wall within the room.

Additionally, though not actually visible to the user or headset itself from their current locations, the headset may identify an electrocardiograph (EKG) machine 414 that is located within a cabinet 416 that has its doors closed to obstruct any view of the machine 414. Owing to the headset's camera being unable to capture images of the machine 414 since it is not visible from outside the cabinet 416, the headset may identify the location of the machine 414 other ways. For example, the machine 414 may communicate its GPS coordinates to the headset, the headset may already be preprogrammed with the location of the machine 414, and/or the headset may know the location of the machine 414 based on previous simultaneous localization and mapping (SLAM) performed in conjunction with another headset while the doors of the cabinet 416 were open and the machine 414 visible. Still further, beacon signals may be received from the machine 414 that indicate its location. Additionally, a quick response code (or label with a machine identity number) associated with the machine 414 and disposed on an exterior surface of the cabinet 416 and visible to the camera may be identified using object recognition to thus identify the location of the machine 414 as being in the container (cabinet 416) on which the QR code is disposed. Signal triangulation and received signal strength indicator algorithms may also be used to identify the location of the machine 414 based on wireless signals received therefrom.

Once the machines/devices 408, 412, and 414 and their respective locations have been identified through one method or another, associated icons 418, 420, and 422 (or other graphical elements such as thumbnail images of the machines themselves) may be presented on the display 402. As shown, the icon 418 may show fluid in a container to denote the IV machine 408, the icon 420 may show a television set to denote the television 412, and the icon 422 may be an oval with the text "EKG" within it to denote the EKG machine 414.

The icons 418, 420, and 422 may be presented on the display 402 using augmented reality software so that the icons 418, 420, 422 appear to the user to be located not on the display 402 itself but proximate to or at the real-world locations of the respective machines 408, 412, and 414. For example, icons 418 and 420 may respectively be presented a threshold non-zero distance above the respective real-world locations of the respective machines 408, 412 themselves (e.g., three inches above) in the X-Y plane and at a same depth as the machines 408, 412 relative to the current location of the headset itself. However, further note that icons associated with respective machines may also be presented to appear at other locations within the threshold distance of the respective machines, such as to next the associated machines (e.g., to the left or right) and/or below the associated machines.

Still further, in some examples an associated icon for a given device/machine may be presented on the display 402 using augmented reality software so that it appears to the user as actually disposed at the current real-world location of the associated device/machine itself in all three dimensions. An example of this is shown via the icon 422, which is presented via the display 402 to appear as though disposed at the actual real-world location of the machine 414 within the cabinet 416. In some examples, an associated icon being presented as though disposed at the actual location of the associated machine (rather than proximate to it) may only occur when the headset determines that the associated machine itself is not currently visible to the user, and otherwise icons may be presented to appear proximate to but not at the current real world locations of visible machines. However, in other examples an associated icon may be presented as though disposed at the actual location of the associated machine even if the associated machine is visible based on user preference, configurations set by a system administrator, etc.

As also shown in FIG. 4, in some examples the headset may present instructions 424 on the display 402. The instructions 424 may include text indicating that the user should stare at a particular icon and speak voice input in order for the voice input to be wirelessly routed to a machine associated with the icon for processing or execution of a command/function in conformance with the voice input.

The instructions 424 may also include text indicating that the user should stare at a particular icon for a threshold amount of time (e.g., five seconds) to "lock" voice input as being routed to the associated machine. "Locking" voice input to the associated machine may be used so that the user may speak voice input that will be routed to the associated machine for processing even if the user diverts his or her gaze away from staring at the particular icon while speaking (or even speaking after looking away and pausing). The user may then "unlock" voice input from always being routed to the associated machine by again staring at the associated icon for the same or a different threshold period of time, and/or by blinking a predetermined number of times (e.g., twice) within a threshold period of time when again gazing at the associated icon. The user may also "unlock" voice input by staring for a threshold amount of time at a release selector 426 presented on the display 402, and/or selecting the selector 426 another way such as via voice input or an "air tap" where the user gestures to touch the associated icon where it appears to be located in the real world (as tracked by the headset's outward-facing camera(s)).

Note that where the user is gazing and for how long may itself be determined based on execution of eye tracking software using images from one or more cameras on the headset that are oriented inward to image the user's eyes.

Then once the user has been identified as looking at a given icon for directing voice input thereto, and/or once the user "locks" voice input as being routed to a given machine, additional graphical elements 428 may be presented to visually highlight the selected icon and associated machine. In this example, the icon 420 for the associated machine 412 has been selected and arrows 428 have been presented to highlight as much.

Figure 5:
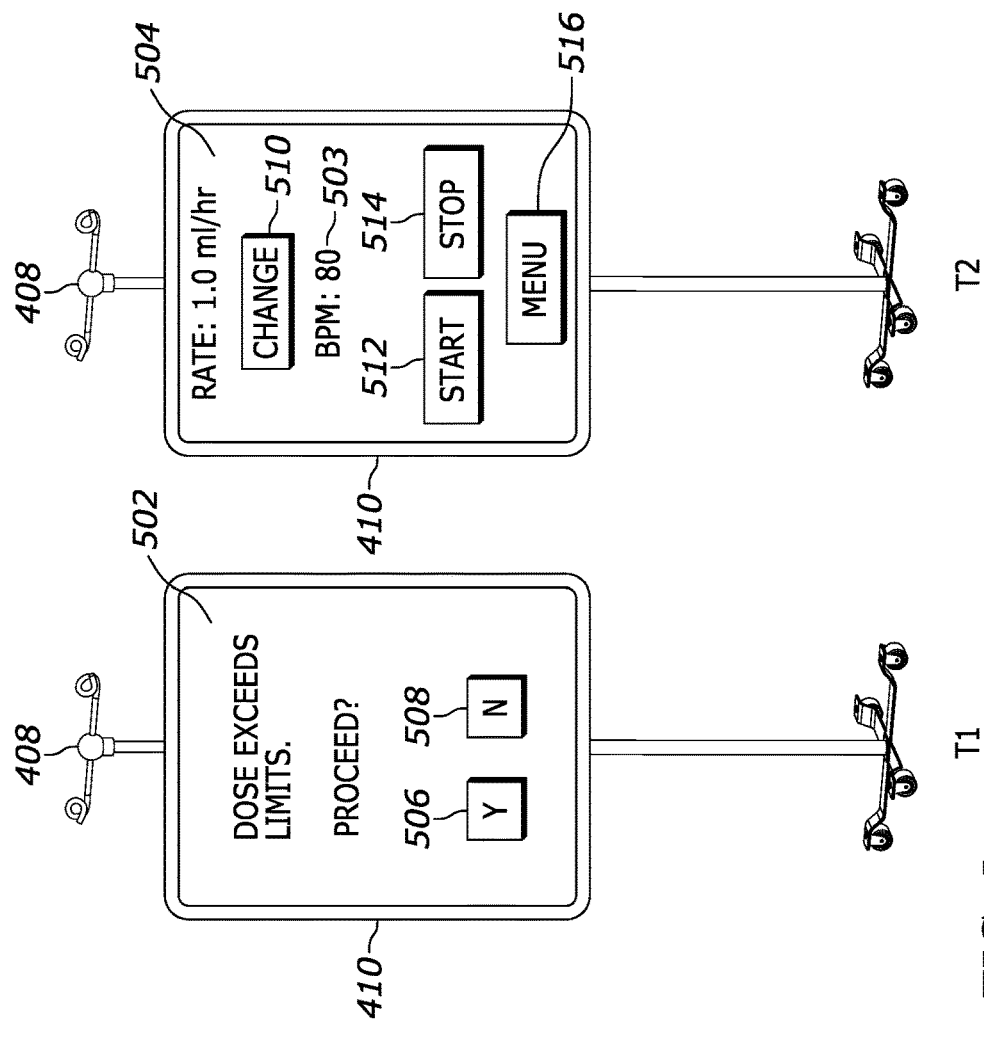
FIG. 5 shows a hybrid graphical user interface (GUI) that may be presented on the transparent display consistent with present principles.
Figure 5:
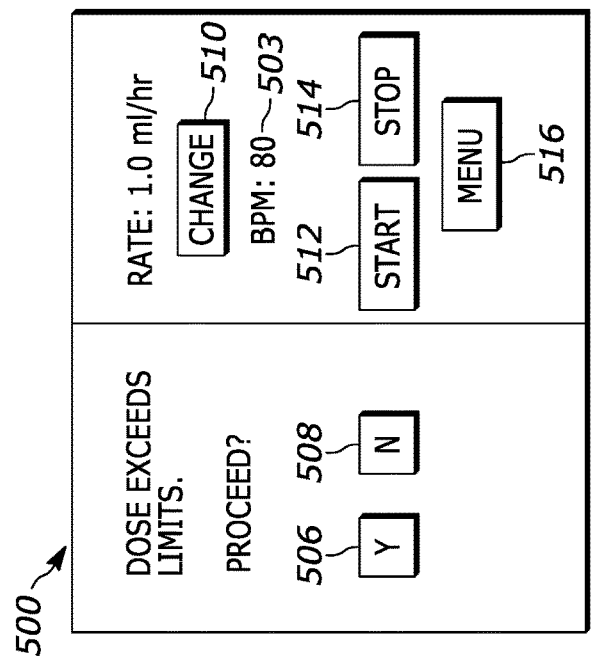

It is to also be understood consistent with present principles that in some embodiments the respective icons themselves that are associated with various devices/machines may be further selectable to provide a command to the headset for a detailed graphical user interface (GUI) such as the GUI 500 of FIG. 5 to be presented on the display 402. The icons may be selected for such purposes via air tap, voice input, gazing constantly at a given icon until a graphical hourglass 430 empties its sand to a lower chamber, etc. The icons may also be selected using a cursor under control of a mouse or track pad, based on selection of a push button on the housing of the headset itself, and/or based on selection of a push button or soft button on another input device in wired or wireless communication with the headset (e.g., a remote control or smart phone).

Once an icon is selected according to the paragraph above, one or more GUIs presentable on a display of the associated machine itself may be presented on the display 402 of the headset, e.g., based on wireless communication of the GUI(s) to the headset from the associated machine. As shown in FIG. 5, two GUIs 502, 504 that are separately presentable on the display 410 of the IV machine 408 at different times (e.g., time "T1" and time "T2" as shown) may be combined into the single hybrid GUI 500 presented on the display 402 of the headset. This might occur even if the GUIs 502, 504 are not concurrently presentable together on the display 410 owing to a limited amount of display space on which to present the GUIs 502, 504, owing to the GUIs 502, 504 otherwise being presented only upon separate user commands, etc. Also, note that the GUI 500 may be updated in real time as the machine 408 would otherwise update the GUIs 502, 504 based on its operation, administration of fluids, user commands, updates to data related to the vital signs 503 of the patient 404, etc.

As also shown in FIG. 5, the hybrid GUI 500 may include some or all of the same graphical elements as presented on the respective GUIs 502, 504 themselves (e.g., same selectors, prompts, and/or data representations). For example, the GUI 500 may include the warning from the GUI 502 that a desired dose of prescription fluids exceeds a common medical limit, along with a yes selector 506 from the GUI 502 that is selectable to administer the fluids anyway and a no selector 508 from the GUI 502 to decline to do so. The selector 510 of the GUI 504 to change the flow rate of fluids administered via the machine 408 may also be presented on the combined GUI 500 of FIG. 5. The same can be said for the start selector 512, stop selector 514, and menu selector 516 of the GUI 504 that are respectively selectable to command the machine 408 to start administration of the fluids, stop administration of the fluids, or present a menu GUI associated with the machine 408. The respective selectors themselves as presented on the GUI 500 may be selectable using any of the methods described herein, such as via air tap, voice command, selection using a cursor, staring for a threshold period of time, etc.

Figure 6:
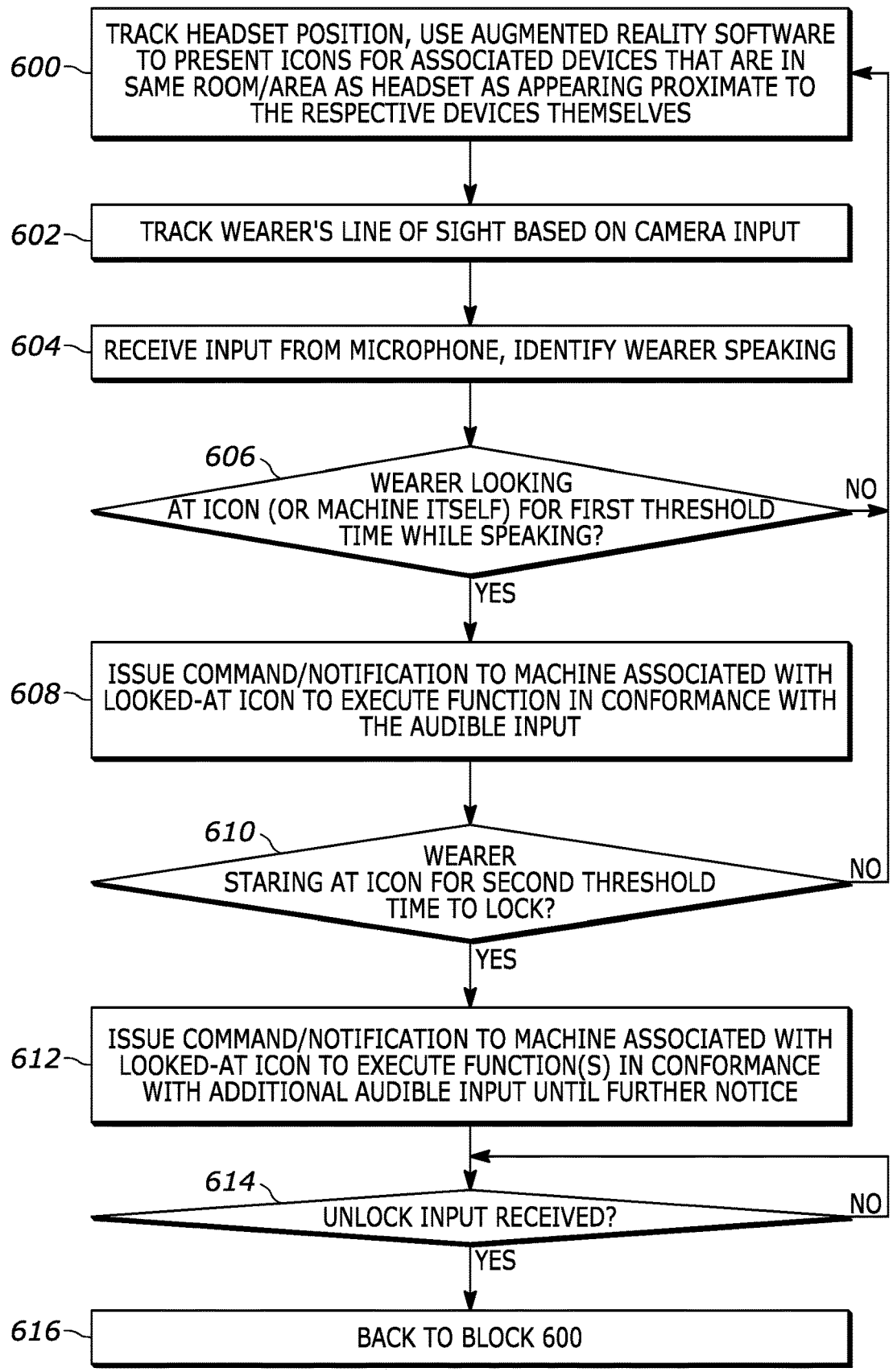
FIGS. 6 and 7 are flow charts of example algorithms executable by a device consistent with present principles.

Now referring to FIG. 6, it shows example logic that may be executed by a device such as the system 100 and/or a headset with transparent display in accordance with present principles. For example, the logic of FIG. 6 may be executed by the headset described above in reference to FIGS. 4 and 5. Also note that in some examples the logic of FIG. 6 may be executed in part by a remotely-located server in communication with the headset.

Beginning at block 600, the device may track its position using augmented reality software, a SLAM algorithm, image registration and computer vision, etc. Also at block 600, the device may use augmented reality software and/or stereoscopic images to present icons for associated devices/machines located in the real world that are in the same room or area as the headset consistent with present principles. The icons may be presented on the device's transparent display so that they appear at least proximate to the real-world location of the associated machines. From block 600 the logic may then proceed to block 602.

At block 602 the device may execute an eye tracking algorithm to track the user's line of sight based on camera input that indicates the direction and depth of the user's gaze. From block 602 the logic may then proceed to block 604 where the device may receive input from a microphone on the device and identify the user as speaking audible input based on the input from the microphone. For example, the device may use voice recognition to determine that the user has potentially provided a command or other voice input to the device that the device is to route to another machine such as, e.g., an IV machine within a hospital room for execution of a function by the IV machine.

Then to determine whether the user has in fact provided voice input or is merely speaking words that were not meant to be provided as input, the logic may move to decision diamond 606 where the device may determine whether the user, while speaking, is looking at an icon presented on the device's transparent display that is associated with another machine. In some but not all examples, the user must be determined to be looking at the icon for at least a first threshold non-zero amount of time (e.g., two seconds) to avoid false positives due to the user quickly glancing at the icon while speaking words that were not meant to be provided as input.

Additionally, note consistent with present principles that in some examples the user may also look at the associated machine itself as disposed in the real world in order to provide input to it through speaking (rather than looking at an associated icon that might be presented on the device's transparent display). In these examples, the determination at diamond 606 may therefore be based on whether the user is looking at the machine itself while speaking.

In either case, a negative determination at diamond 606 may cause the logic to revert back to block 600 and proceed therefrom. However, an affirmative determination at diamond 606 that the user is in fact looking at an icon (or associated machine) may instead cause the logic to proceed to block 608. At block 608 the device may, without receiving a wake up word/phrase at any point, issue a command or notification to the associated machine to execute a function in conformance with the audible input from the user. A digital assistant executing at the machine itself may then be used to execute the function indicated by the device. The function may include adjusting operation of hardware of the machine (e.g., adjusting the rate at which an IV machine administers fluids, turning on sensors for different vital signs that the machine is to monitor, etc.), audibly reporting data to the user, presenting a certain menu on the machine's display, etc.

Also at block 608, in some examples the device may transmit a command to still other machines in the same room or area to not execute any function in conformance with the audible input, e.g., if digital assistants executing at the other machines would otherwise pick up on the audible input and attempt to execute a command accordingly.

From block 608 the device may then proceed to decision diamond 610. At diamond 610 the device may determine whether the user is staring at the associated icon for a second threshold non-zero amount of time that may be longer than the first threshold non-zero amount of time described above in reference to diamond 606. Staring for the second threshold non-zero amount of time may be done in order to lock voice input as being directed to the associated machine as described above.

A negative determination at diamond 610 may cause the logic to revert back to block 600 and proceed therefrom. However, an affirmative determination at diamond 610 may instead cause the logic to proceed to block 612. At block 612 the device may continue to route commands or notifications to the machine to execute functions in conformance with additional audible input that might be received regardless of whether the user continues to look at the associated icon or not. The logic of FIG. 6 may then proceed to decision diamond 614.

At diamond 614 the device may determine whether to unlock voice input from being routed to the associated machine consistent with the description above. A negative determination at diamond 614 may cause the logic to continue making the determination at diamond 614 until such time as an affirmative determination is made. Then upon an affirmative determination being made at diamond 614 the logic may proceed to block 616. At block 616 the logic may revert back to block 600 and proceed therefrom.

Figure 7:
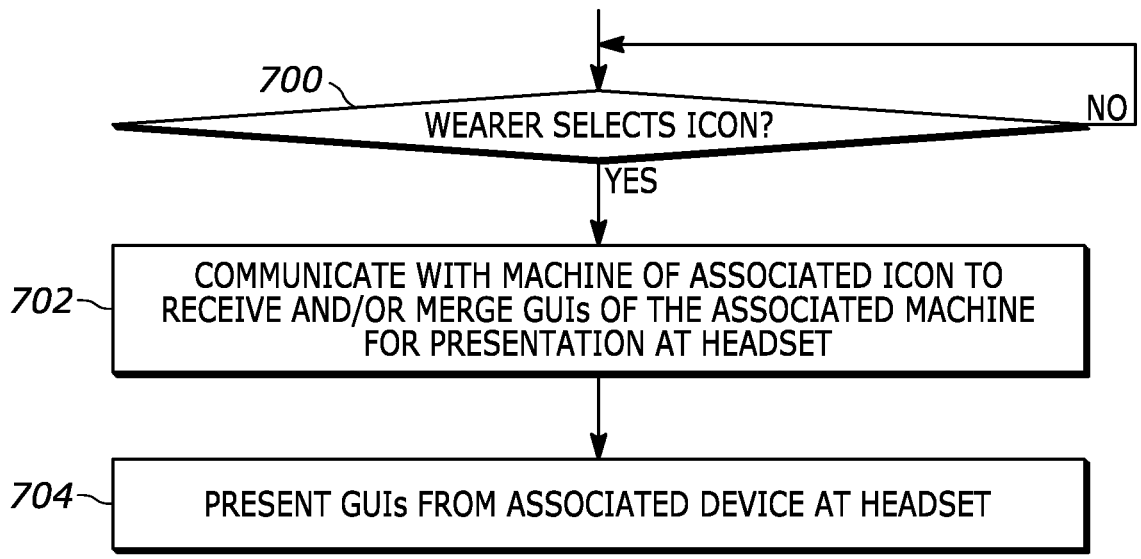

Now describing FIG. 7, it also shows example logic that may be executed by the same device that executes the logic of FIG. 6 (e.g., an AR headset) in order to present a hybrid GUI at the device consistent with present principles. The logic of FIG. 7 may therefore be executed in conjunction with the logic of FIG. 6.

Beginning at diamond 700, the device may determine whether the user has selected an icon presented on the device's transparent display. An icon may be selected using any of the non-staring methods described above in reference to FIGS. 4 and 5, for example. A negative determination at diamond 700 may cause the logic to continue making the determination at diamond 700 until such time as an affirmative determination is made. Then upon an affirmative determination being made at diamond 700 the logic may proceed to block 702.

At block 702 the device may communicate with another machine/device associated with the icon to receive and/or merge GUIs of the associated machine for presentation of a hybrid GUI using the device's transparent display consistent with present principles. The logic may then move to block 704 where the device may use augmented reality software to actually present the hybrid GUI on the device's transparent display.

Figure 8:
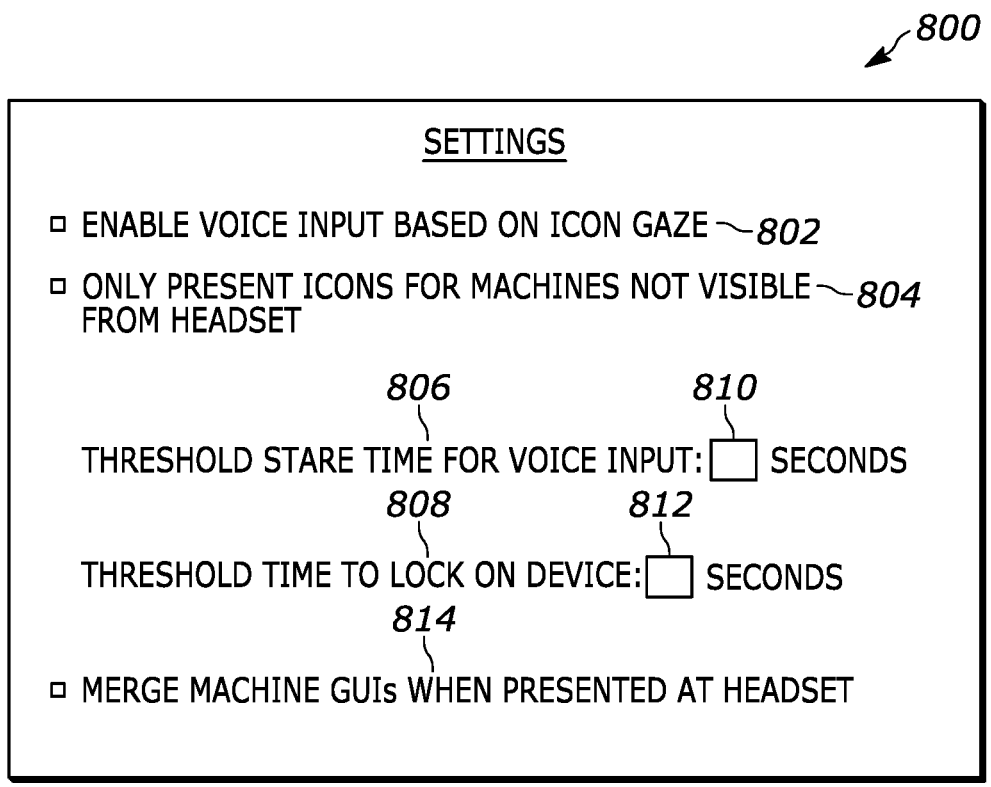
FIG. 8 shows an example GUI for configuring one or more settings of a device that operates consistent with present principles.

Continuing the detailed description in reference to FIG. 8, it shows an example GUI 800 that may be presented on the display of a device undertaking present principles, such as a transparent display of an AR headset and/or the display of a smart phone communicating with the AR headset to undertake present principles. It is to be understood that each of the options to be discussed below in reference to FIG. 8 may be selected by selecting the respective check box shown adjacent to the respective option.

As shown in FIG. 8, the GUI 800 may include a first option 802 that may be selectable to enable or set the device to route voice input to other machines based on a user of the device being identified as looking at respective icons while providing the voice input. For example, the option 802 may be selected to enable the device to undertake the operations discussed above in reference to FIGS. 4 and 5 as well as to execute the logic of FIGS. 6 and 7.

The GUI 800 may also include an option 804 that may be selectable to enable or set the device to only present icons for machines that are not visible to the user from the user's current location and perspective. Thus, should the option 804 be selected, the device may be configured to only present icons for machines that are not currently visible to the user but the user may still direct input to other machines that are visible but do not have associated icons presented on the device's transparent display simply by looking at the associated machine itself.

The example GUI 800 of FIG. 8 may also include settings 806 and 808. The setting 806 may be controlled to configure the threshold amount of time used at diamond 606 as described above to avoid false positives due to the user quickly glancing at an icon while speaking words that were not meant to be provided as input. Accordingly, an input box 810 may be presented as part of the GUI 800 for the user to provide numerical input to establish that threshold amount of time.

The setting 808 may be controlled to configure the threshold amount of time used at diamond 610 to lock voice input as being directed to an associated machine. Accordingly, an input box 812 may be presented as part of the GUI 800 for the user to provide numerical input to establish that threshold amount of time.

As also shown in FIG. 8, the GUI 800 may include an option 814 that may be selectable to configure the device to merge different GUIs presentable at a different machine at different times as disclosed herein. Thus, selection of the option 814 may configure the device to merge different GUIs as disclosed herein and in certain examples where the option 814 is not selected, the device may instead simply present the same single GUI on its transparent display that is currently presented on the display of the other machine itself.

Before concluding, it is to be understood that the functions described above as being performed by a headset may also be undertaken by devices other than headsets, such as smart phones or tablet computers having their own camera feeds of environments that may be presented on their own respective touch-enabled displays along with the icons and other graphical elements disclosed herein. For instance, a smart phone or other computing device might also undertake the logic of FIGS. 6 and 7 and present an icon associated with another device on its display, even if the smart phone's display is not transparent, by using augmented reality software to still present the icon on its display as if disposed at the real-world location of the other device.

Additionally, note that a first device (e.g., the smart phone in the preceding sentence) may identify a user as looking at a second device for identifying audible input to route to the second device consistent with present principles even if the first device does not have a display at all (e.g., if the first device is a head-mounted camera system not including a display). Present principles may also apply in instances where a system remote from the user routes audible input to another device based on identification of the user as looking at the other device using input from cameras remote from the user but still within the user's environment to track the user's line of sight.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor;
a display accessible to the at least one processor; and
storage accessible to the at least one processor and comprising instructions executable by the at least one processor to:
identify a second device as being not currently visible to a user, the second device being a non-virtual object;
based on identifying the second device as being not currently visible to the user, present on the display a first graphical element that is associated with the second device and at which the user can look while speaking first audible input to command the first device to transmit a first notification to the second device to control the second device based on the first audible input, the first graphical element being presented so that the first graphical element appears disposed within the real world at or proximate to a location of the second device, the second device being different from the first device and existing in the real world;
identify a third device as being currently visible to the user, the third device being a non-virtual object; and
based on identifying the third device as being currently visible to the user, decline to present on the display a second graphical element that is associated with the third device and instead identify the user as looking at the third device itself while speaking second audible input to command the first device to transmit a second notification to the third device to control the third device based on the second audible input, the third device being different from the first device.

2. The first device of claim 1, wherein proximate to the location of the second device comprises one or more of: within a threshold non-zero distance to the second device, above or next to the location of the second device at a same depth as the second device relative to the first device.

3. The first device of claim 1, comprising at least one camera, and wherein the instructions are executable to:
  identify the user as looking at the first graphical element and third device based on input from the at least one camera.

4. The first device of claim 1, wherein the instructions are executable to:
  identify the user as looking at the first graphical element for at least a threshold non-zero amount of time; and
  based on the identification of the user as looking at the first graphical element for at least the threshold non-zero amount of time, transmit the first notification to the second device;
  wherein the threshold amount of time is established through a settings graphical user interface (GUI), the settings GUI comprising an element at which the threshold amount of time is specifiable, the settings GUI being different from the first graphical element.

5. The first device of claim 1, wherein the instructions are executable to:
  present a settings graphical user interface (GUI) on the display, the settings GUI comprising a first option that is selectable to set the first device to subsequently and for multiple future instances identify whether respective devices are currently visible to the user and, based on the respective devices being not currently visible to the user, present associated graphical elements at which the user can look to control the respective devices using audible input; and
  wherein the settings GUI comprises a second option that is selectable a single time to set the first device to, for plural instances in the future, issue respective notifications to one or more other respective devices to execute respective functions in conformance with respective different audible inputs as provided by the user while looking at respective graphical elements associated with the respective devices, the second option being different from the first option.

6. The first device of claim 1, wherein the instructions are executable to:
  based on identifying the third device as being currently visible to the user, decline to present on the display any graphical element that is associated with the third device.

7. The first device of claim 1, wherein the instructions are executable to:
  identify in a first instance that the user is looking at the first graphical element as presented on the display while speaking the first audible input;
  based on the identification in the first instance, transmit the first notification to the second device;
  identify in a second instance that the user is looking at the third device itself while speaking the second audible input; and
  based on the identification in the second instance, transmit the second notification to the third device.

8. The first device of claim 1, wherein the instructions are executable to:
  lock voice input as being directed to the second device so that voice input can continue to be received to control the second device even while the user is no longer looking at the first graphical element;
  subsequent to locking the voice input as being directed to the second device so that voice input can continue to be received to control the second device even while the user is no longer looking at the first graphical element, identify user input to unlock voice input from being used to control the second device so that voice input is no longer used to control the second device without the user again looking at the first graphical element; and
  based on the identifying of user input to unlock voice input from being used to control the second device, unlock voice input from being used to control the second device until the user again looks at the first graphical element.

9. The first device of claim 8, wherein the user input to unlock voice input comprises the user staring for a threshold amount of time at the first graphical element.

10. The first device of claim 8, wherein the user input to unlock voice input comprises the user staring for a threshold amount of time at a third graphical element, the third graphical element being different from the first graphical element.

11. The first device of claim 8, wherein the user input to unlock voice input comprises the user air tapping at a third graphical element.

12. The first device of claim 8, wherein the user input to unlock voice input comprises a predetermined number of blinks within a threshold period of time while gazing at the first graphical element.

13. The first device of claim 12, wherein the predetermined number of blinks is greater than one.

14. The first device of claim 1, wherein the instructions are executable to:
  present, while the first graphical element is presented on the display, instructions on the display, the instructions comprising text indicating that the user should stare at the first graphical element to control the second device via audible input.

15. A method, comprising:
  at a first device, identifying a second device as being not currently visible to a user, the second device being a non-virtual object;
  based on identifying the second device as being not currently visible to the user, presenting on a display a first graphical element that is associated with the second device and at which the user can look while speaking first audible input to command the first device to transmit a first notification to the second device to control the second device based on the first audible input, the second device being different from the first device and existing in the real world;
  at the first device, identifying a third device as being currently visible to the user, the third device being a non-virtual object; and
  based on identifying the third device as being currently visible to the user, declining to present on the display a second graphical element that is associated with the third device and identifying the user as looking at the third device itself while speaking second audible input to command the first device to transmit a second notification to the third device to control the third device based on the second audible input, the third device being different from the first device.

16. The method of claim 15, comprising:
  presenting on the display a graphical user interface (GUI), the GUI being different from and not including the first and second graphical elements, the GUI comprising an option that is selectable a single time to enable the first device to, for plural instances in the future, transmit respective notifications to one or more other respective devices to execute respective functions in conformance with respective different audible inputs as provided by the user while looking at respective graphical elements associated with the respective devices.

17. The method of claim 15, comprising:
based on identifying the third device as being currently visible to the user, declining to present on the display any graphical element that is associated with the third device.

18. The method of claim 15, comprising:
identifying in a first instance that the user is looking at the first graphical element as presented on the display while speaking the first audible input;
based on the identifying in the first instance, transmitting the first notification to the second device;
identifying in a second instance that the user is looking at the third device itself while speaking the second audible input; and
based on the identifying in the second instance, transmitting the second notification to the third device.

19. At least one computer readable storage medium (CRSM) that is not a transitory signal, the computer readable storage medium comprising instructions executable by at least one processor to:
at a first device, identify a second device as being not currently visible to a user, the second device being a non-virtual object;
based on the identification of the second device as being not currently visible to the user, present on a display a first graphical element that is associated with the second device and at which the user can look while speaking first audible input to command the first device to transmit a first notification to the second device to control the second device based on the first audible input, the second device being different from the first device and existing in the real world;
at the first device, identify a third device as being currently visible to the user, the third device being a non-virtual object; and
based on the identification of the third device as being currently visible to the user, identify the user as looking at the third device itself while speaking second audible input to command the first device to transmit a second notification to the third device to control the third device based on the second audible input, the third device being different from the first device.

20. The CRSM of claim 19, wherein the instructions are executable to:
identify in a first instance that the user is looking at the first graphical element as presented on the display while speaking the first audible input;
based on the identification in the first instance, transmit the first notification to the second device;
identify in a second instance that the user is looking at the third device itself while speaking the second audible input; and
based on the identification in the second instance, transmit the second notification to the third device.

\* \* \* \* \*